United States Patent
Webb, III et al.

(10) Patent No.: US 9,491,727 B2
(45) Date of Patent: Nov. 8, 2016

(54) SYSTEM AND METHOD FOR MONITORING NETWORK SYNCHRONIZATION

(71) Applicant: Anue Systems, Inc., Austin, TX (US)

(72) Inventors: Charles A. Webb, III, Austin, TX (US); Jason C. Nutt, Austin, TX (US); Simon A. Mackenzie, Austin, TX (US); Joshua D. Karnes, Cedar Park, TX (US)

(73) Assignee: Anue Systems, Inc., Austin ( * ) Notice: Subject to any disclaimer, the term of this patent is extended or adjusted under 35 U.S.C. 154(b) by 73 days.

(21) Appl. No.: 14/022,466

(22) Filed: Sep. 10, 2013

(65) Prior Publication Data

US 2015/0071308 A1    Mar. 12, 2015

(51) Int. Cl.
*H04W 56/00* (2009.01)
*H04J 3/06* (2006.01)
*H04J 3/14* (2006.01)

(52) U.S. Cl.
CPC ........ *H04W 56/0035* (2013.01); *H04J 3/0661* (2013.01); *H04J 3/14* (2013.01)

(58) Field of Classification Search
None
See application file for complete search history.

(56) References Cited

U.S. PATENT DOCUMENTS

| | | | |
|---|---|---|---|
| 5,521,907 A | 5/1996 | Ennis, Jr. et al. | |
| 5,805,602 A | 9/1998 | Cloutier et al. | |
| 6,041,352 A | 3/2000 | Burdick et al. | |
| 6,058,102 A | 5/2000 | Drysdale et al. | |
| 6,097,699 A | 8/2000 | Chen et al. | |
| 6,542,754 B1 * | 4/2003 | Sayers et al. | 455/502 |
| 6,556,540 B1 | 4/2003 | Mawhinney et al. | |
| 6,614,763 B1 | 9/2003 | Kikuchi et al. | |
| 6,628,642 B1 * | 9/2003 | Mile'n et al. | 370/350 |
| 6,728,209 B2 | 4/2004 | Pate et al. | |
| 6,831,890 B1 | 12/2004 | Goldsack et al. | |
| 6,863,619 B2 | 3/2005 | Blacklock | |
| 7,292,537 B2 | 11/2007 | Chareranoon | |
| 7,716,375 B2 | 5/2010 | Blum et al. | |
| 7,787,576 B2 | 8/2010 | Foerster et al. | |
| 7,821,958 B2 | 10/2010 | Smith et al. | |
| 7,990,880 B2 | 8/2011 | Emori | |

(Continued)

OTHER PUBLICATIONS

Hirschmann, White Paper, "Precision Clock Synchronization", The Standard IEEE 1588, Jul. 2009, 20 pgs.

(Continued)

*Primary Examiner* — Ayaz Sheikh
*Assistant Examiner* — Peter Chau
(74) *Attorney, Agent, or Firm* — Egan Peterman Enders Huston

(57) ABSTRACT

Systems and methods are disclosed for monitoring network synchronization. The disclosed embodiments utilize time window snapshots to capture network time information and compare the captured time information against time reference information to determine network time errors. These network time errors can then be analyzed with respect to selected operating parameters and tolerances to determine network synchronization errors and to generate alarms. Certain embodiments are configured to capture time information data and to analyze this captured data locally to determine time error data. Certain other embodiments are configured to utilize multiple capture devices and to transmit time error data to a central snapshot synchronization monitor. The central snapshot synchronization monitor can also communicate control information to the capture devices to control the snapshot time windows. In addition, synchronization errors can be used as trigger events to cause additional capture of time information by other capture devices.

29 Claims, 8 Drawing Sheets

(56) References Cited

U.S. PATENT DOCUMENTS

| | | |
|---|---|---|
| 8,027,267 B2 | 9/2011 | Denby et al. |
| 8,243,599 B2 | 8/2012 | Becker et al. |
| 8,300,749 B2 | 10/2012 | Hadzic et al. |
| 8,345,570 B2 | 1/2013 | Wong et al. |
| 8,427,966 B2 | 4/2013 | Ilnicki |
| 8,532,148 B2 | 9/2013 | Homma et al. |
| 8,593,975 B2 | 11/2013 | El-Hennawey et al. |
| 9,100,320 B2 | 8/2015 | Hsy et al. |
| 2004/0167990 A1* | 8/2004 | Peer .................. H04J 3/0661 709/248 |
| 2006/0077902 A1 | 4/2006 | Kannan et al. |
| 2007/0058562 A1 | 3/2007 | Scobbie |
| 2009/0276542 A1 | 11/2009 | Aweya et al. |
| 2010/0085989 A1 | 4/2010 | Belhadj et al. |
| 2011/0064091 A1 | 3/2011 | Darras et al. |
| 2011/0075685 A1* | 3/2011 | Xu et al. ............... 370/503 |
| 2011/0122871 A1* | 5/2011 | Shenoi ............... H04J 3/0641 370/389 |
| 2011/0134766 A1 | 6/2011 | Zampetti et al. |
| 2011/0222515 A1* | 9/2011 | Wang et al. ............ 370/338 |
| 2012/0213234 A1* | 8/2012 | Zhang et al. ........... 370/474 |
| 2012/0275317 A1* | 11/2012 | Geva et al. ............ 370/250 |
| 2013/0163618 A1* | 6/2013 | Sergeev et al. ........ 370/503 |
| 2013/0170507 A1 | 7/2013 | Hsueh et al. |
| 2013/0315265 A1 | 11/2013 | Webb, III et al. |
| 2014/0169157 A1* | 6/2014 | Pan .................. H04L 41/0668 370/228 |

OTHER PUBLICATIONS

Office Action dated Nov. 5, 2014, for Webb III et al., "System and Method for Direct Passive Monitoring of Packet Delay Variation and Time Error in Network Packet Communications", U.S. Appl. No. 13/792,342, filed Mar. 11, 2013, 12 pgs.

Response to Office Action filed Mar. 4, 2015, for Webb III et al., "System and Method for Direct Passive Monitoring of Packet Delay Variation and Time Error in Network Packet Communications", U.S. Appl. No. 13/792,342, filed Mar. 11, 2013, 8 pgs.

Notice of Allowance dated May 12, 2015, for Webb III et al., "System and Method for Direct Passive Monitoring of Packet Delay Variation and Time Error in Network Packet Communications", U.S. Appl. No. 13/792,342, filed Mar. 11, 2013, 9 pgs.

Office Action dated Jun. 6, 2016, for Webb III et al., "System and Method for Direct Passive Monitoring of Packet Delay Variation and Time Error in Network Packet Communications", U.S. Appl. No. 14/819,985, filed Aug. 6, 2015, 22 pgs.

\* cited by examiner

SYSTEM AND METHOD FOR MONITORING NETWORK SYNCHRONIZATION

TECHNICAL FIELD OF THE INVENTION

This invention relates to the use of network communication systems and, more particularly, to monitoring synchronization within such network communication systems.

BACKGROUND

Network communication systems are used for a wide variety of applications including voice and data services. For example, mobile communication systems utilize a variety of wired and wireless networked systems to provide communications between mobile handsets, landline telephones, IP (Internet Protocol) connected devices, and/or other communication devices. It is often desirable to monitor frequency and phase of signals being transmitted within network communication systems to determine if the communications are within accepted tolerances. For example, specifications for many mobile communication system standards require communications to have frequency deviations and/or phase deviations that are within predetermined limits.

Frequency synchronization for some mobile communication systems has previously been provided through the physical layer frequency of high-speed Time Division Multiplexed (TDM) communication links (e.g., E1 or T1 lines). Phase and frequency synchronization for some other mobile communication systems has previously been provided through the use of GPS (Global Positioning System) or other GNSS (Global Navigation Satellite System) timing signals. High-speed TDM communication links and/or satellite systems both provide physical layer timing signals for synchronizing mobile communication systems. However, in newer mobile communication systems, which make use of smaller, denser and lower cost base stations, such synchronization signals may not be available, reliable, cost-effective or practical (e.g., where T1 links are replaced with lower cost packet-based links; where satellite signals are deemed unreliable because they are vulnerable to jamming; or where satellite antennas are not possible or are cost prohibitive). Accordingly, some newer communication systems rely either wholly or partially upon packet-based time synchronization techniques, such as for example, PTP (Precision Time Protocol), CES (Circuit Emulation Service), SAToP (Structure-agnostic Time-Division-Multiplexing over Packet), or another packet-based timing protocol.

Frequency synchronization that is derived from the aforementioned physical layer signals is inherent in the level transitions of the signal itself (e.g., voltage transitions from logic "0" to logic "1"). By contrast, frequency and phase synchronization information that is to be derived from packet-timing-protocol based techniques is not inherent in the physical layer signal. Rather, such packet-timing-protocol based systems rely upon receiving packets, time-stamping them, and analyzing all packets being communicated within a packet flow, which can increase the processing requirements and cause delays. Further, packet layer impairments (e.g., packet loss and delay variation) adversely affect synchronization performance where packet-based timing protocols are utilized.

Phase synchronization is also used for some mobile communication systems, particularly newer systems. Timing for phase synchronization has traditionally been provided using GNSS timing signals. However, as indicated above, satellite systems are often not available or not practical (e.g., satellite antenna not possible or cost prohibitive). Newer systems have increasingly relied upon packet-based techniques such as PTP or NTP (Network Time Protocol) for phase synchronization. As indicated above, these timing-protocol based techniques rely upon receiving, time-stamping and analyzing all packets being communicated within a packet flow, which can lead to delays and significant processing requirements. Further, as above, packet layer impairments (e.g., packet loss and delay variation) adversely affect phase synchronization performance where packet-based timing protocols are utilized.

It is noted that in some circumstances wireless operators may rely on third party network operators to provide "backhaul" communications between a mobile site and a wireless packet core network. This use of third-party backhaul providers is more common in countries like the United States and less common in countries where the telecommunications networks are now or once were operated by an agency of the national government (sometimes known as the Postal, Telephone and Telegraph service, or PTT). Timing performance requirements for wireless backhaul systems are still being developed, and techniques for providing adequate measurements of backhaul performance are also yet to be fully developed.

With respect to the use of GNSS for timing synchronization, it is noted that certain characteristics of GNSS are problematic for some solutions. GNSS antennas/receivers, for example, may be impractical to physically implement and/or may be too costly. For example, from a cost perspective, GNSS receivers may be prohibitively expensive for small cells or applications. From a physical implementation perspective, antenna cabling may be difficult to install or may need to extend over long distances (e.g., cabling for a tall sky scraper). Antenna sites may also be costly or unavailable. Further, GNSS receivers can be vulnerable to jamming, and GNSS jammers are widely available. Other emerging threats to GNSS reliability include spoofing and meaconing. Accordingly, operators may not want to depend wholly or partly on GNSS for timing synchronization.

In addition, with respect to the use of GPS, which is a specific type of GNSS, it is noted that GPS is a system run by the United States Navy. Wireless network operators, and particularly those operators located in other countries, may be uncomfortable relying, in whole or in part, upon a United States military system to synchronize their civilian wireless networks. Accordingly, some operators may not want to depend on GPS for timing synchronization.

It is further noted that packet-based techniques for frequency and phase synchronization rely upon the ability of the communication equipment to transmit packets at precise instants in time, and upon the ability of the communication equipment to precisely record the instant in time when a packet arrives. The times of transmission and reception are referred to as time stamps. Packet-timing systems (e.g., NTP or PTP) follow defined protocols for transferring the necessary time information from a source network device to a destination network device. The destination network device then analyzes the packets and their time stamps so that the frequency or phase of the sink matches that of the source.

Because the performance of packet-based timing protocol techniques is not inherent in the physical layer signal, it can be more difficult to monitor its performance. And because the performance of packet-based timing protocol techniques can be impaired by packet loss and delay variation, it can be increasingly important to monitor their performance. Further, packet-layer impairments introduced by third-party backhaul operators may need to be measured at the point of demarcation for service assurance and fault localization. Accordingly, monitoring the performance of packet-timing-protocol based synchronization is both more important and more difficult than it has been in previous systems that relied upon physical-layer synchronization signals.

In short, frequency and/or phase synchronization is needed for a variety of network systems, including network voice and data communication systems. However, current solutions have undesirable reliability, cost, and delay disadvantages.

SUMMARY OF THE INVENTION

Systems and methods are disclosed for monitoring network synchronization. The disclosed embodiments utilize time window snapshots to capture network time information and compare the captured time information against time reference information to determine network time errors. These network time errors can then be analyzed with respect to selected operating parameters and tolerances to determine network synchronization errors and to generate network synchronization alarms. Certain embodiments are configured to capture time information data and to analyze this captured data locally. Certain other embodiments are configured to utilize multiple capture devices and to transmit the time error data from the multiple capture devices to a central snapshot synchronization monitor that aggregates and analyzes the captured time error data. The central snapshot synchronization monitor can also communicate control information to the capture devices to control the time windows applied by the capture devices, if desired. In addition, synchronization errors can be used as trigger events to cause additional capture of time information by other capture devices in order to allow further network fault analysis. Other features and variations can be implemented, if desired, and related systems and methods can be utilized, as well.

Disclosed embodiments include a method for monitoring network synchronization including capturing time information for a first time period associated with a network being monitored, comparing the captured time information for the first time period to time reference information to determine a first synchronization metric for the first time period, analyzing the first synchronization metric with respect to a second synchronization metric to determine if a synchronization error is present with respect to the network being monitored, and outputting a synchronization error alarm if a synchronization error is determined to be present. For further embodiments, the capturing step during the first time period includes capturing packets associated with a packet flow within the network being monitored, recording time stamps associated with arrival times for the captured packets, the time stamps providing the time reference information for the comparing step, and analyzing the packets to identify timing information contained within the packets where the identified time information providing the captured time information for the first time period for the comparing step.

In additional embodiments, the captured time information can be time information generated by a network node within the network being monitored. Further, the network node can be a mobile base station configured to communicate with a plurality of mobile handsets, and the generated time information can be time-of-day information generated by the mobile base station. Still further, the generated time information can be a clock signal generated by the network node. In addition, the second synchronization metric can be associated with time information captured from one or more previous time periods prior to the first time period.

In other embodiments, the second synchronization metric can be one or more predefined threshold values. Further, the one or more predefined threshold values can include a threshold time error difference between the captured time information and the time reference information. In addition, the time reference information can be based upon time information from at least one of a satellite positioning system or a network-based timing protocol clock.

In further embodiments, the synchronization error alarm can be a trigger event associated with a first network node, and the method can further include capturing time information within additional time periods for at least one additional network node based upon the trigger event.

In still further embodiments, the capturing and comparing steps can be performed by a plurality of capture devices coupled to different monitoring points for the network being monitored. Further, the method can further include transmitting time data associated with the first synchronization metric from the plurality of capture devices to a central synchronization monitor that performs the analyzing and outputting steps. In addition, the method can include applying one or more data reduction techniques to the time data prior to transmitting the time data. Still further, the data reduction techniques can include at least one of a data compression technique or a hash algorithm. Still further, the method step can further include communicating control information from the central synchronization monitor to the plurality of capture devices to determine the first time period. Also, the synchronization error can include a synchronization impairment introduced by one or more network components associated with the monitoring points.

Disclosed embodiments also include a system for monitoring network synchronization including a snapshot window control block configured to output snapshot control signals, a snapshot capture block configured to capture time information from a network being monitored for a first time period based upon the snapshot control signals, a time synchronization comparator configured to compare the captured time information for the first time period to time reference information to determine a first synchronization metric for the first time period, a synchronization analysis block configured to analyze the first synchronization metric with respect to a second synchronization metric to determine if a synchronization error is present with respect to the network being monitored, and a data output block configured to output a synchronization error alarm if a synchronization error is determined to be present.

For other embodiments, the snapshot capture block is configured to capture packets associated with a packet flow within the network being monitored, and the snapshot capture block further includes a time stamp block configured to generate time stamps associated with arrival times for the captured packets to provide the time reference information for the time synchronization comparator. Further, the system can also include a network time information extractor configured to identify timing information contained within the captured packets, the identified time information providing the captured time information for the first time period for the time synchronization comparator. In addition, the captured time information can include time information generated by a network node within the network being monitored. Still further, the generated time information can include at least one of a clock signal generated by the network node or time-of-day information generated by the network node.

In other embodiments, the second synchronization metric can be associated with time information captured from one or more previous time periods prior to the first time period. In addition, the second synchronization metric can include one or more predefined threshold values. Further, the one or more predefined threshold values can be a threshold time error difference between the captured time information and the time reference information. Still further, the time reference information can be based upon time information from at least one of a satellite positioning system or a network-based timing protocol clock.

In further embodiments, the synchronization error alarm can be a trigger event associated with a first network node, and the system can further include a snapshot window controller configured to forward snapshot window controls to cause time information to be captured within additional time periods for at least one additional network node based upon the trigger event.

In still further embodiments, the synchronization analysis block and the data output block can be within a central synchronization monitor coupled to a capture device having the snapshot window control block, the snapshot capture block, and the time synchronization comparator; and the capture device can be configured to transmit time data associated with the first synchronization metric to the central synchronization monitor. In addition, the system can further include one or more additional capture devices also including a snapshot window control block, a snapshot capture block, and a comparator; and each of the capture devices can be coupled to a different monitoring point and be configured to transmit time data associated with the first synchronization metric to the central synchronization monitor. Further, each of the capture devices can be further configured to apply one or more data reduction techniques to the time data prior to transmitting the time data. Still further, the central synchronization monitor can be further configured to communicate control information to each of the capture devices to determine the first time period. Also, the synchronization error can be a synchronization impairment introduced by one or more network components associated with the monitoring points.

Additional and/or different features and embodiments can be also implemented, as desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
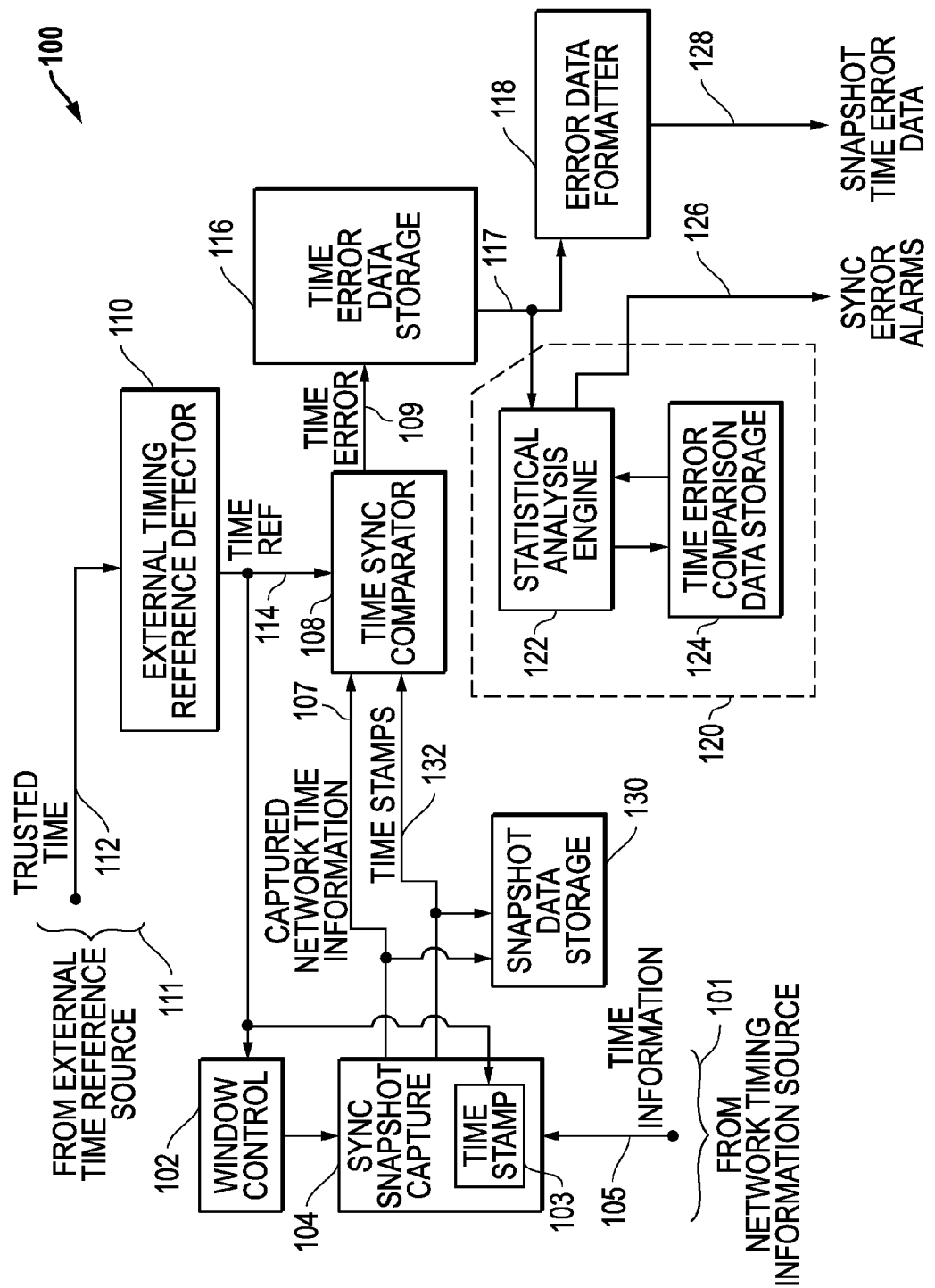
FIG. 1 is a block diagram of an embodiment for utilizing a snapshot time window to capture network timing information for monitoring network synchronization.

Systems and methods are disclosed for monitoring network synchronization. The disclosed embodiments utilize time window snapshots to capture network time information and compare the captured time information against time reference information to determine network time errors. These network time errors can then be analyzed with respect to selected operating parameters and tolerances to determine network synchronization errors and to generate network synchronization alarms. Certain embodiments are configured to capture time error data and to analyze this captured data locally. Certain other embodiments are configured to utilize multiple capture devices and to transmit the captured time error data from the multiple capture devices to a central snapshot synchronization monitor that aggregates and analyzes the captured time error data. The central snapshot synchronization monitor can also communicate control information to the capture devices to control the time windows applied by the capture devices, if desired. In addition, synchronization errors can be used as trigger events to cause additional capture of time information by other capture devices in order to allow further network fault analysis. Other features and variations can be implemented, if desired, and related systems and methods can be utilized, as well.

The snapshot time windows applied by the disclosed embodiments to capture network time information advantageously reduce complexity and cost of synchronization monitoring systems. The snapshot time windows reduce system complexity and cost because only a portion of the traffic load occurring within a network system is monitored. Further, as connections to monitoring devices are often limited in bandwidth, the time window snapshots allow for reduced data transfer requirements that can be satisfied by such lower bandwidth connections. The disclosed embodiments also recognize that statistical snapshot sampling of the network traffic being monitored can provide effective synchronization monitoring, even though all packets within the traffic are not monitored. For example, monitoring ten (10) second bursts of network traffic every 200 seconds (e.g., less than or equal to about 5% of the packet flow at a monitoring point) can yield error results with adequate timeliness and quality to provide for effective monitoring of network synchronization. Further, where time error data is transmitted from capture devices to a central processing system, data reduction techniques can also be utilized to improve performance.

It is noted that the disclosed embodiments can be utilized in a variety of implementations to provide synchronization monitoring for network environments. The disclosed embodiments are particularly useful for monitoring of a demarcation point between two different network operators for SLA (Service Level Agreement) assurance/enforcement. Different features and variations can be implemented, as desired, and related systems and methods can be utilized, as well.

FIG. 1 is a block diagram of an embodiment 100 that utilizes a snapshot time window to capture network timing information for monitoring network synchronization. Window control block 102 receives a time reference (TIME REF) 114 from external timing reference detector 110 and applies control signals to synchronization snapshot capture block 104 to determine a snapshot time window for capturing time information 105 from a network timing information source 101. The network timing information source 101 is associated with a network monitoring point. The time stamp block 103, which also receives the time reference 114, records time stamps corresponding to the value of the time reference 114 at the arrival time instants at which timing information 105 is captured with respect to the snapshot time window. As described herein, the snapshot time windows can be applied periodically, if desired, to capture multiple different snapshots of network timing information over time. The external timing reference detector 110 operates to provide the time reference 114 by obtaining high-precision or trusted time information 112 from an external time reference source 111. After the snapshot time window has been applied, the captured network timing information 107 and the recorded time stamps 132 are provided to the time synchronization comparator 108, which can also receive the time reference 114. The captured network timing information 107 and the recorded time stamps 132 can also be stored in a snapshot data storage system 130, if desired. The time synchronization comparator 108 compares the captured network time information 107 with the recorded time-stamps 132 to determine a synchronization metric associated with the snapshot window. For the embodiment 100, the synchronization metric is assumed to be time error information. As such, time error information 109 is output by the time synchronization comparator 108 and is stored within the time error data storage system 116 for further processing.

If remote processing of time error information is desired, time error data 117 can be provided to an external processing system. As depicted, for example, the time error data 117 is provided to error data formatter 118, which operates to format the time error data 117 and to send the resulting snapshot time error data 128 to an external processing system. As described in further detail below, the error data formatter 118 can apply one or more data reduction techniques to the time error data 117, if desired, prior to sending the snapshot time error data 128. This data reduction reduces the communication bandwidth that is needed for communication of the snapshot time error data 128. As also described in more detail below, window control information can be provided by an external system to determine the window control signals provided by window control block 102 to determine the snapshot time windows. It is also noted that the snapshot data stored in data storage system 130 could also be formatted by the data formatter 118 and sent back to an external processing system as part of data 128, if desired.

It is noted that a variety of data reduction techniques can be utilized for the time error data 117. For example, if packets are captured to determine network time information, time error data information associated with captured packets can be compressed into a small number of data packets to send back to a central monitoring point. Compression algorithms and/or hash algorithms can also be used to reduce transmitted data. Other data reduction techniques could also be utilized, as desired. It is further noted that different and/or additional snapshot related information can also be communicated by the capture device 100 in addition to and/or instead the time error data 128, if desired.

If local processing of the time error data is desired, time error data 117 from data storage system 116 is provided to a synchronization analysis block 120. Synchronization analysis block 120 includes a statistical analysis engine 122 that receives the time error data 117 and analyzes the time error data 117 with respect to network operating parameters and tolerances to determine whether or not synchronization errors are present. The statistical analysis engine 122 can then output synchronization error alarms 126 indicating the presence of synchronization errors when detected. Time error comparison data storage system 124 can be used to store the network operating parameters and tolerances that are used by the statistical analysis engine 122. Further, the data storage system 124 can also be used to store prior time error measurement data and analysis results, for example, where comparisons are made by the statistical analysis engine 122 to operating parameters associated with prior snapshot measurements.

It is noted that a variety of time reference sources could be utilized alone or in combination to provide the trusted time information 112. For example, GPS (Global Position System) timing information or timing information from other navigation or positioning systems (e.g., satellite-based or ground-based) can be utilized. Network time protocol clocks can also be utilized, such as an NTP (Network Time Protocol) reference clock or a PTP (Precision Time Protocol) master clock. A high stability oscillator, such as an ovenized quartz oscillator or miniature atomic clock, can provide a stable frequency signal to hold an accurate notion of time when other sources, such as GPS or PTP, are unavailable. Other high-precision or trusted time reference sources could also be utilized, if desired.

It is further noted that the network time information 105 can be associated with a variety of network monitoring points and related time information sources. For example, timing packets captured from a packet flow can be utilized to provide the time information. Time information generated by a network node within the network being monitored can also be utilized. For example, time-of-day information generated by a network system can be utilized to provide the captured time information, such as time-of-day information generated by a mobile base station for mobile handsets. Further, a reference clock signal generated by a network node can be utilized to provide the captured time information, such as a 1 PPS (pulse per second) reference clock signal generated by a network switch device. In addition, time information could be recovered from the signals transmitted being transmitted within the network. Other time information sources within a network being monitored could also be utilized to obtain the captured time information for the snapshots.

Figure 2:
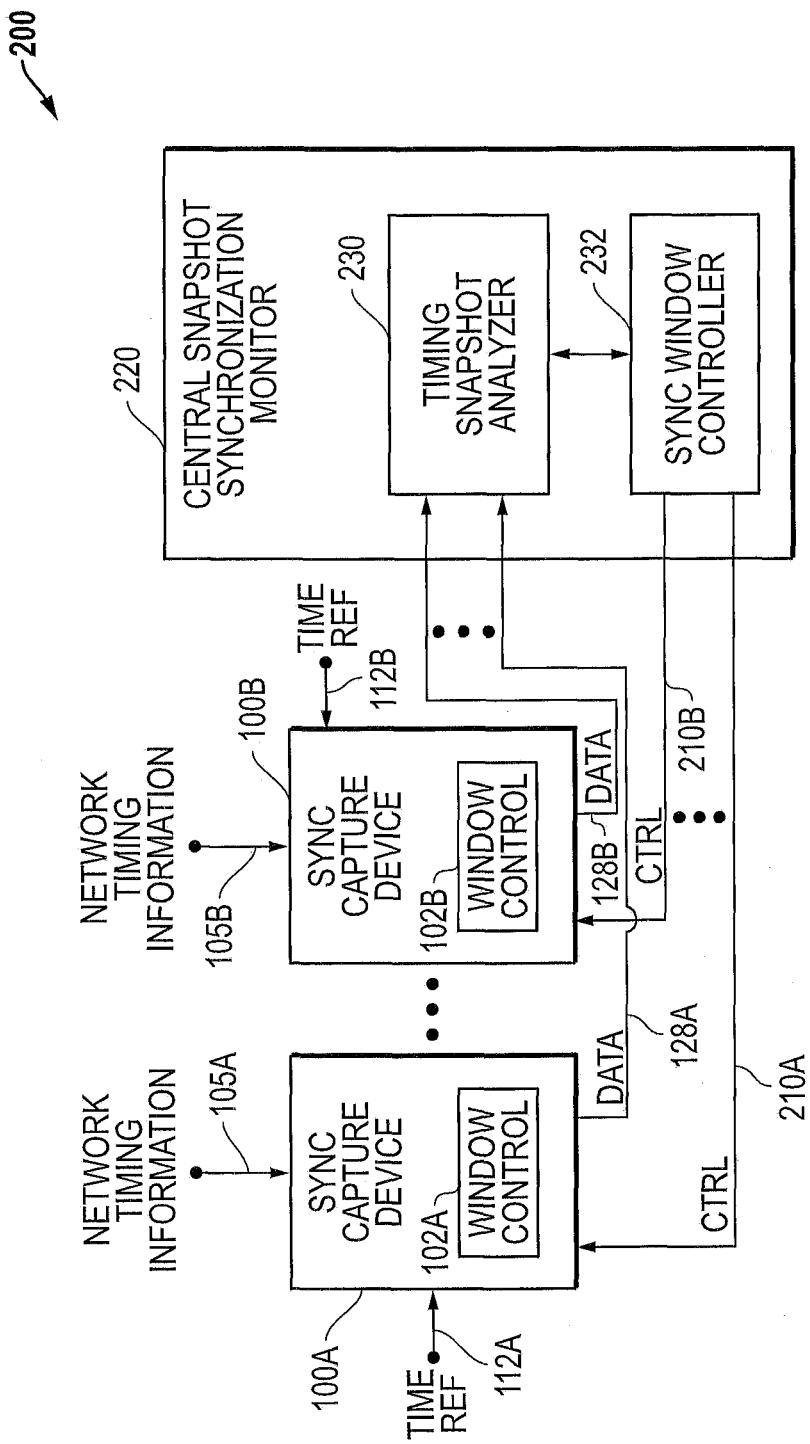
FIG. 2 is a block diagram of an embodiment for a synchronization monitoring system including multiple synchronization capture devices communicating with a central snapshot synchronization monitor.

FIG. 2 is a block diagram of an embodiment 200 for a synchronization monitoring system including multiple synchronization capture devices 100A . . . 100B communicating with a central snapshot synchronization monitor 220. As described further below, each of the synchronization capture devices 100A . . . 100B can be coupled to received network timing information from different network monitoring points within a network being monitored. For the embodiment 200 depicted, synchronization capture device 100A captures network timing information 105A according to the window control signals provided by window control block 102A. The synchronization capture device 100A then utilizes time reference 112A to determine time error measurements. The resulting time error data 128A is formatted and transmitted to central snapshot synchronization monitor 220. Similarly, synchronization capture device 100B captures a network timing information 105B according to the window control signals provided by window control block 102B. The synchronization capture device 100B then utilizes time reference 112B to determine time error measurements. The resulting time error data 128B is formatted and transmitted to central snapshot synchronization monitor 220. It is noted that the sources for the time references 112A and 112B can be the same or could be different, if desired. Further, as noted above, additional and/or different snapshot data stored in a data storage system associated with each capture device 100A . . . 100B could also be sent to the central snapshot synchronization monitor 220 as part of data 128A . . . 128B, if desired.

The central snapshot synchronization monitor 220 includes timing snapshot analyzer 230 that operates to aggregate and analyze the snapshot error data 128A . . . 128B received from the synchronization capture devices 110A . . . 100B. The central snapshot synchronization monitor 220 also includes synchronization window controller 232 that can operate to provide time window control (CTRL) information 210A . . . 210B to the synchronization capture devices 110A . . . 100B. The window control blocks 102A . . . 102B within the synchronization capture devices 110A . . . 100B can then utilize this window control information to determine the snapshots time windows applied to capture snapshot network time information. As such, the central snapshot synchronization monitor 220 can provide centralized control of when the capture devices 110A . . . 110B capture snapshots of time information from the network monitoring points for the network system being monitored.

Figure 3:
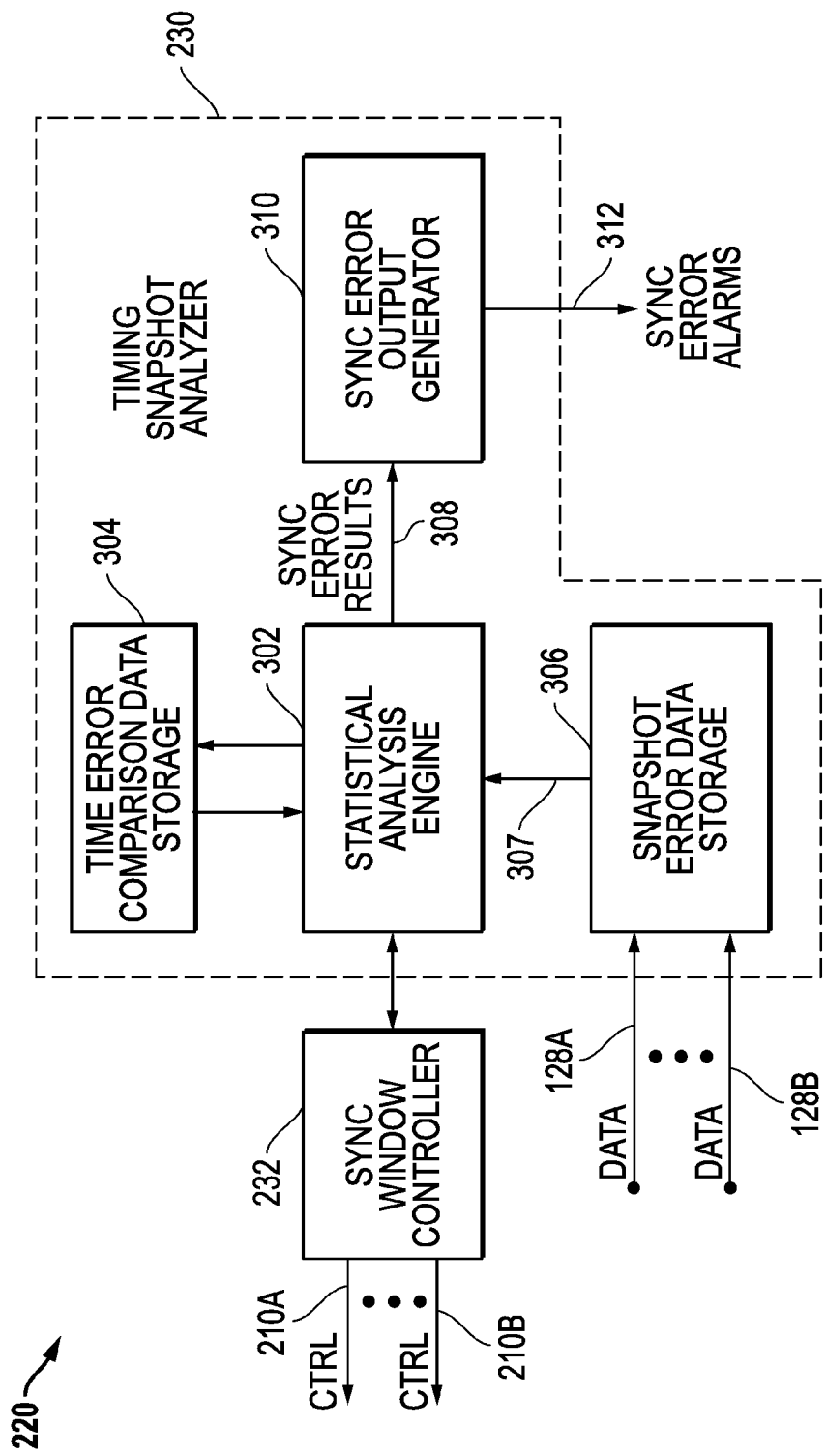
FIG. 3 is a more detailed block diagram for the central snapshot synchronization monitor.

FIG. 3 is a more detailed block diagram for the central snapshot synchronization monitor 220. As described above, the synchronization window controller 232 can be utilized to provide time window control (CTRL) information 210A . . . 210B to synchronization capture devices 100A . . . 100B. The resulting snapshot error data 128A . . . 128B transmitted by the synchronization capture devices 100A . . . 100B is received by timing snapshot analyzer 230 and stored in snapshot error data storage system 306. The statistical analysis engine 302 analyzes the snapshot error data 307 from the data storage system 306 against network operating parameters and tolerances to detect synchronization errors and to output synchronization error results 308 for further processing and use. The time error comparison data storage system 304 can be used to store the network operating parameters and tolerances that are used by the statistical analysis engine 302. Further, the time error comparison data storage system 304 can also be used to store synchronization error data determined for prior snapshots, for example, where comparisons are made by statistical analysis engine 302 to prior snapshot measurements. The synchronization error results 308 can include a variety of desired information. For example, the synchronization error results can include error information concerning a synchronization impairment introduced by one or more network components and/or other desired error information. The synchronization error output generator 310 receives and process the synchronization error results 308 to generate one or more synchronization error alarms 312. The synchronization error alarms 312 can be utilized, for example, to warn system administrators of synchronization error conditions with the network system that may need to be addressed. For example, the synchronization error alarm 312 can be configured to indicate that time synchronization for the network being monitored is outside a desired limit.

Figure 4:
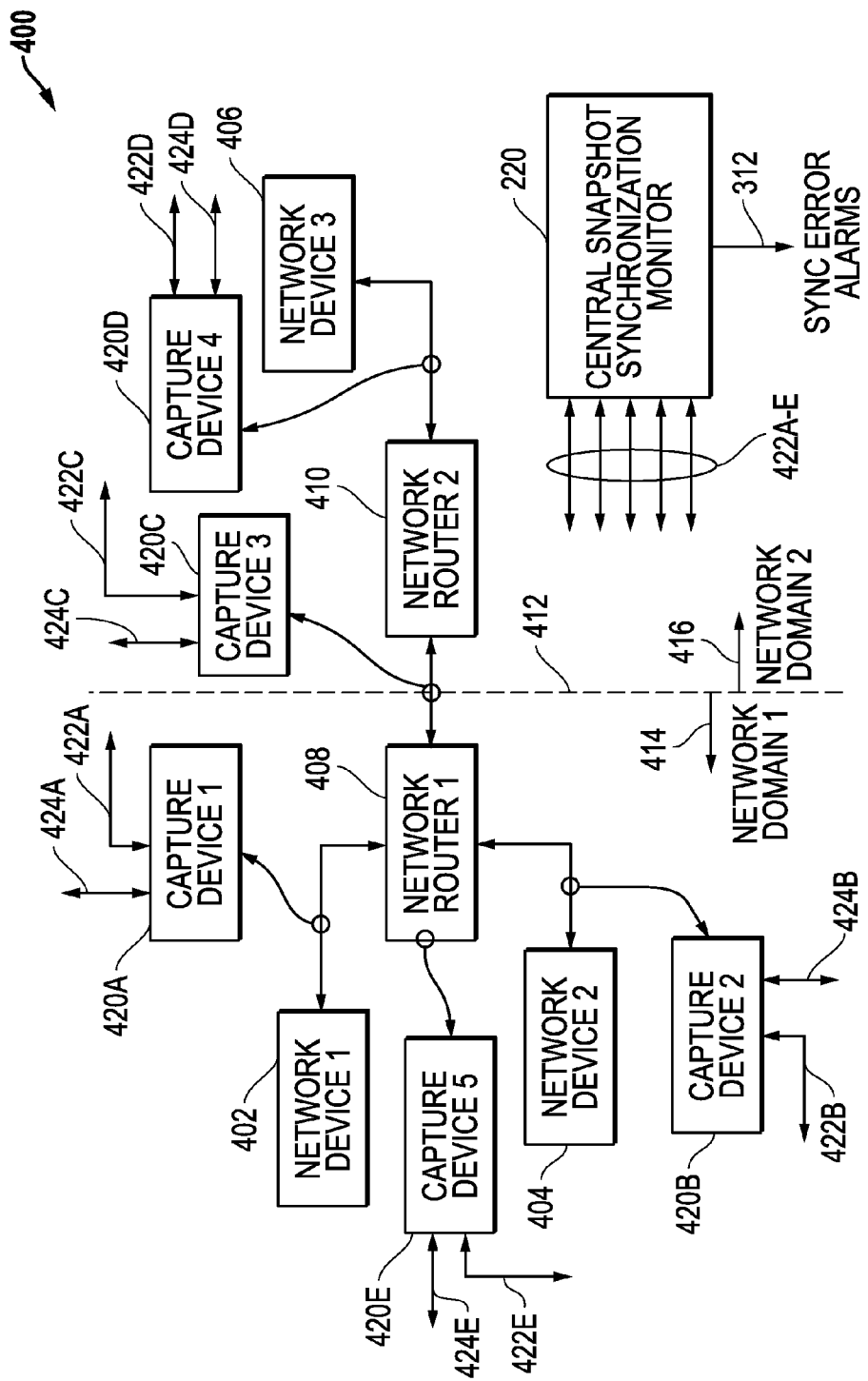
FIG. 4 is a block diagram of an embodiment for a network environment including multiple synchronization capture devices communicating snapshot error data results with a central snapshot synchronization monitor.

FIG. 4 is a block diagram of an embodiment 400 for a network environment including multiple synchronization capture devices 420A, 420B, 420C, 420D and 420E communicating snapshot error data results to a central snapshot synchronization monitor 220. The capture devices 420A-E can be configured as shown for embodiment 100 within FIG. 1, if desired, and can include or not include a synchronization analysis block 120. For the embodiment depicted, dashed line 412 represents a demarcation between a first network domain (DOMAIN1) 414 that includes a first network router (ROUTER1) 408 and a second network domain (DOMAIN2) 416 that includes a second network router (ROUTER2) 410. A first network device 402 and a second network device 404 are coupled to the first network router 408. A third network device 406 is coupled to the second network router 410. Communications can occur between any one or more of the routers and devices within the network environment. It is further noted that embodiment 400 is a simplified representation, and network environments can be implemented with any desired number of communicating devices and interconnection devices, such as routers and switches, and with a variety of communication media, such as metallic cable, fiber optic cable, and microwave links Mobile handsets, for example, often communicate with base stations, which in turn communicate with other intervening systems and devices to provide mobile communications.

In operation, the synchronization capture devices 420A-E and related capture snapshots are used to provide synchronization monitoring for one or more monitoring points within the network environment 400. For the embodiment depicted, the five synchronization capture devices 420A-E are coupled to different monitoring points within the network environment. The first capture device 420A is configured to capture snapshots of timing information between the first network device 402 and the first network router 408. The second capture device 420B is configured to capture snapshots of timing information between the second network device 404 and the first network router 408. The third capture device 420C is configured to capture snapshots of timing information between the first network router 408 and the second network router 410. The fourth capture device 420D is configured to capture snapshots of timing information between the third network device 406 and the second network router 410. And the fifth capture device 420E is configured to capture snapshots of timing information directly from the first network router 408. As described herein, communications 422A-E between the central snapshot synchronization monitor 220 and the capture devices 420A-E can include snapshot time window control information from the central snapshot synchronization monitor 220 and the resulting snapshot error data from the capture devices 420A-E.

As also described herein, the central snapshot synchronization monitor 220 can analyze the resulting snapshot error data to generate one or more synchronization error alarms 312. Further, the central snapshot synchronization monitor 220 can utilize the resulting time error data to determine where in the network a time error has been introduced. For example, the central snapshot synchronization monitor 220 could determine if a time error was introduced within the first network domain (DOMAIN1) 414 or within the second network domain (DOMAIN2) 416. Other determinations could also be made using the snapshot data being captured by the capture devices 420A-E.

It is noted that a variety of different and/or additional information can be communicated between the capture devices 420A-E and the central snapshot synchronization monitor 220 using the communications 422A-E. For example, the capture devices 420A-E can include synchronization analysis block 120 and can communicate synchronization errors directly to the central snapshot synchronization monitor 220. Further, as represented by communications 424A-E, the capture devices 420A-E can communicate information among each other, if desired, such as snapshot and/or time error related information, as well as control information and/or other desired information. For example, one of the capture devices 420A-E can communicate information related to a snapshot to other capture devices 420A-E and/or to other network nodes in addition to or instead of the central snapshot synchronization monitor 220. In addition, one of the capture devices 420A-E can be configured to be a central snapshot synchronization monitor for other capture devices, such that it includes a synchronization window controller 232. It is recognized, therefore, that a wide variety of network topologies and related communications can be utilized, as desired, with respect to the snapshot time information being captured, analyzed, and reported with respect to the capture devices 420A-E.

As further described herein, trigger events can also be utilized to control how one or more of the capture devices 420A-E operate within a coordinated system of capture devices. These trigger events can be based upon synchronization error alarms 126 generated by the capture devices 420A-E, synchronization error alarms 312 generated by the central snapshot synchronization monitor 220, and/or alarms generated by other network nodes. For example, the snapshot windows for multiple capture devices can be coordinated based upon a trigger event detected with respect to snapshot data captured by one or more capture devices. The trigger event can be, for example, a time error failure that is detected at one point in a network, although other trigger events can also be utilized, as desired.

With respect to embodiment 400, a trigger event detected by one of the capture devices 420A-E can be used to control the snapshot windows or other operations of one or more other capture devices 420A-E. For example, if capture device 420E associated with a first network router 408 (e.g., mobile base station) detects a failure through analysis of its snapshot information, the capture device 420E can generate a trigger that is used control a time window snapshot for upstream capture devices, such as capture device 420C and capture device 420D, assuming packets are flowing to network device 406. This trigger can cause a variety of events, such as for example, the saving of the most recent X minutes of data (e.g., 30 minutes) by downstream capture devices. This trigger and subsequent data collection would allow a network monitoring operator to perform forensic analysis, such as for example, searching for the first point in a timing chain where a signal is significantly degraded. Other variations could also be implemented as desired while still relying upon trigger events initiated based upon snapshot information from one or more capture devices to control how one or more other capture devices operate in a coordinated manner to capture and/or report additional time window snapshot data.

Figure 5:
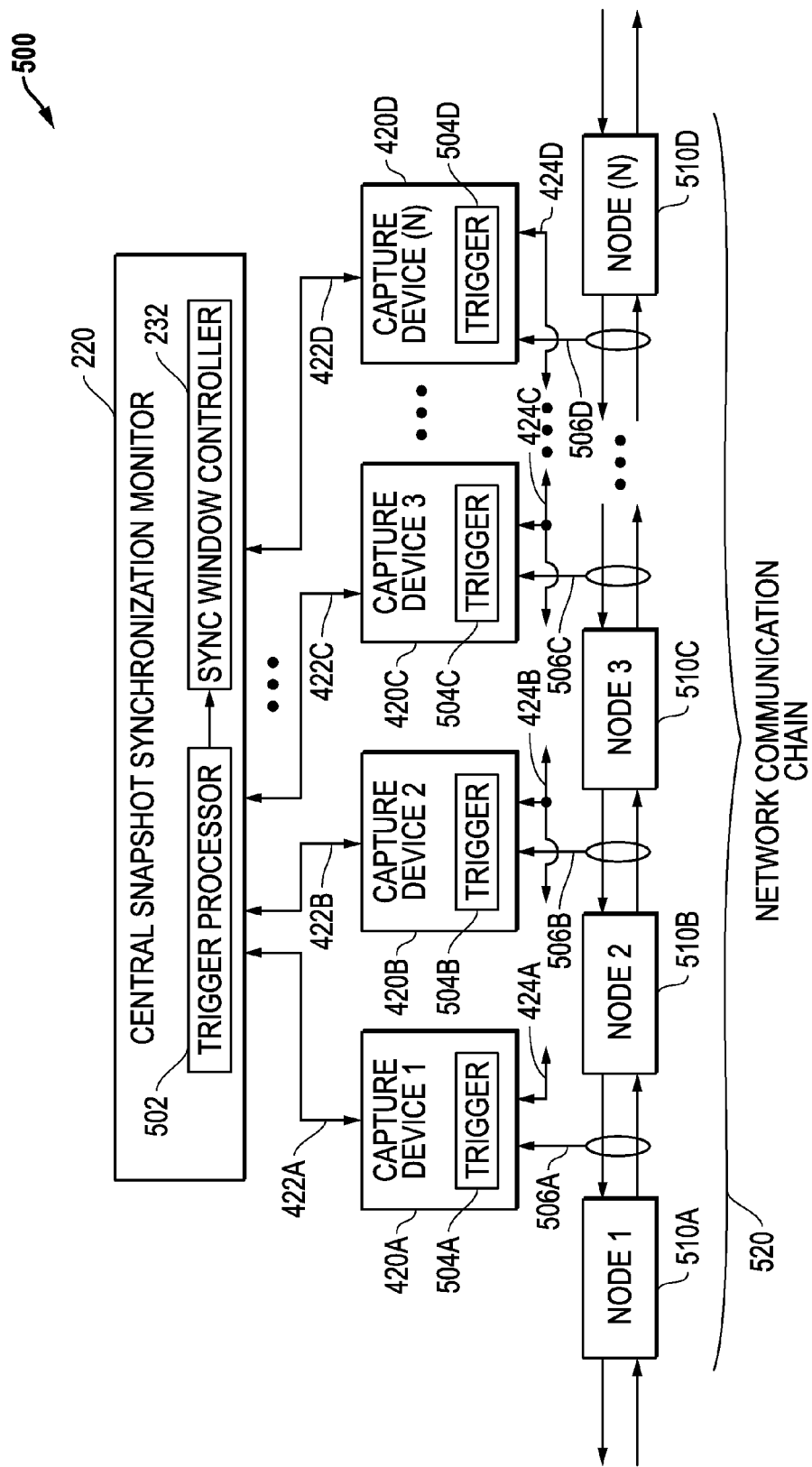
FIG. 5 is a block diagram of an example embodiment where one or more capture devices is utilized to initiate collection of trigger related snapshot data at one or more other capture devices.

FIG. 5 is a block diagram of an example embodiment 500 where one or more capture devices 420A-D are utilized to initiate collection of trigger related snapshot data at one or more other capture devices 420A-D. For the embodiment depicted, it is assumed that the capture devices 420A-D are coupled to monitor points 506A-D and are being utilized to monitor synchronization errors within a network communication chain 520 that includes multiple network nodes 510A-D. It is further noted that each of the network nodes 510A-D could be any of a wide variety of network connected devices, systems, or other processors. For example, network node (NODE 1) 510A could be a cellular base station communicating with a mobile handset, and packets from the mobile handset could be communicated along a chain of network nodes to an Nth network node (NODE(N)) 510D or beyond. A return path could also be provided from the Nth network node (NODE(N)) 510D back to the mobile handset.

As described herein, the capture devices 420A-D can be configured to communicate with a central snapshot synchronization monitor 220 through communications 422A-D. Further, the capture devices can be configured to communicate with each other using communications 424A-D. In addition, the capture devices include trigger modules 504A-D that store configurable trigger parameters. If a synchronization error event detected by one or more of the capture devices 420A-D meets the trigger parameters, then trigger related snapshot controls can be generated and forwarded to one or more of the other capture devices 420A-D, as described herein. The capture devices 420A-D can also report detection of trigger events to the central snapshot synchronization monitor 220. The central snapshot synchronization monitor 220 can be configured to utilize a trigger processor 502 to analyze these trigger reports and/or to separately analyze snapshot data received from the capture devices 420A-D with respect to trigger parameters stored by central snapshot synchronization monitor 220. If a trigger event has occurred at one or more of the capture devices 420A-D, the trigger processor 502 communicates with the synchronization window controller 232, and the synchronization window controller 232 provides trigger related snapshot controls to the capture devices to provide for a coordinated response to the trigger event. Depending upon the particular trigger event detected, the synchronization window controller 232 can be configured to provide different snapshot controls depending upon what additional snapshot data is desired to facilitate further synchronization analysis with respect to the trigger event. For example, if a synchronization error of a particular magnitude is detected at capture device 420A, it may be desirable to determine the point within the communication chain where the signal was first significantly degraded. To make this determination, trigger related snapshot controls could be forwarded to downstream capture devices 420B-420D and the resulting snapshot data could be analyzed to determine where the signal was first significantly degraded. Other trigger events and related controls could also be implemented. The trigger related snapshot control described herein, therefore, allows for a wide variety of trigger events that are detected with respect to one capture device to initiate a coordinated response by other captured devices based upon trigger event related controls provided across the capture device infrastructure.

Figure 6:
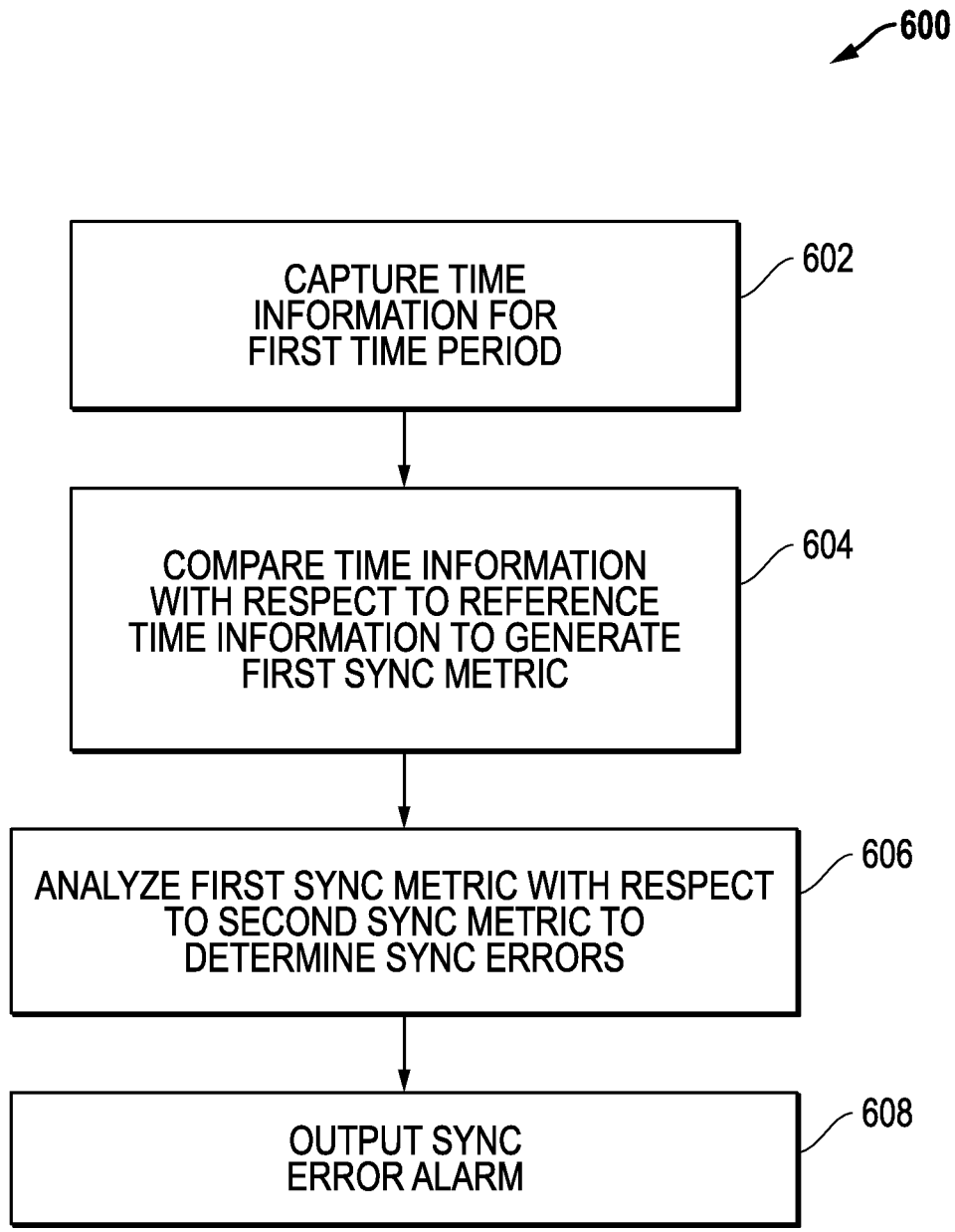
FIG. 6 is a process flow diagram of an embodiment for utilizing time information captured within snapshot time windows to determine network synchronization errors.

FIG. 6 is a process flow diagram of an embodiment 600 for utilizing time information captured during snapshot time windows to determine network synchronization errors. In block 602, time information is captured for a first time period. Next, in block 604, this captured time information is compared to reference time information to compute or otherwise determine a first synchronization metric associated with the first time period. In block 606, the first synchronization metric is then compared to a second synchronization metric to determine whether network synchronization errors are present for the snapshot time information captured during the first time period. In block 608, one or more synchronization error alarms are output based upon the detect network synchronization errors.

Figure 7:
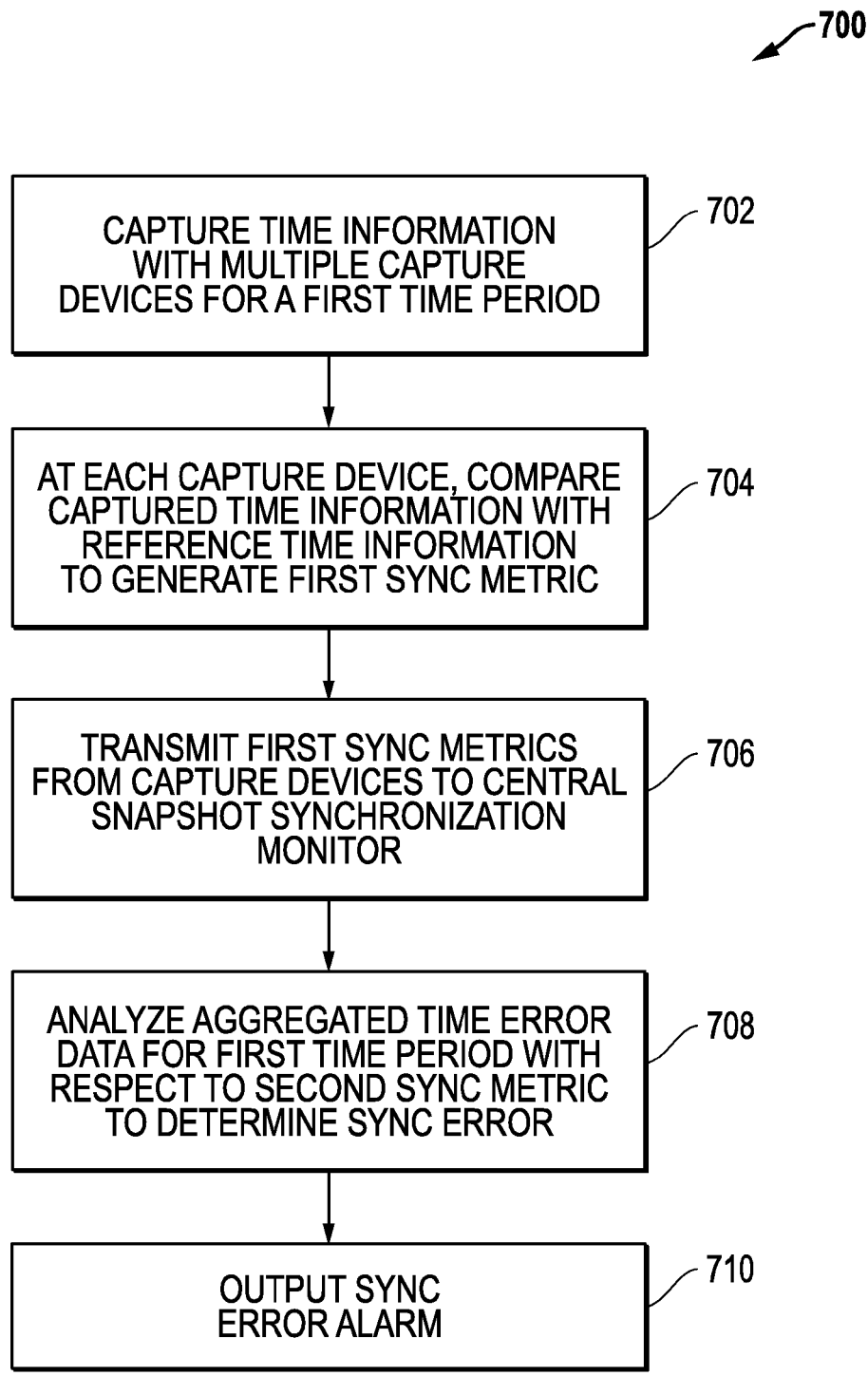
FIG. 7 is a process flow diagram of an embodiment for utilizing time error information generated by multiple capture devices to determine network synchronization errors.

FIG. 7 is a process flow diagram of an embodiment 700 for utilizing time error information generated by multiple capture devices to determine network synchronization errors. In block 702, time information is captured by a plurality of synchronization capture devices for a first time period. In block 704, at each capture device, the captured time information for the first time period is compared with respect to reference time information to generate a first synchronization metric associated with the first time period. In block 706, the first synchronization metrics for the capture devices are transmitted from the capture devices to a central snapshot synchronization monitor. Next, in block 708, the time error data for the first time period is aggregated and analyzed with respect to a second synchronization metric to determine synchronization errors. In block 710, one or more synchronization error alarms are output based upon the detect network synchronization errors.

It is noted that the first and second synchronization metrics can be any desired synchronization metrics for the network being monitored. For example, the first synchronization metric can be a time difference between the captured time information and the reference time information, and the second synchronization metric can be a standard deviation of time differences associated with prior snapshot time windows. As another example, the first synchronization metric can be a time related measurement value associated with the current snapshot, and the second time metric can be one or more predefined threshold values or tolerances that can be compared with the first synchronization metric. As a third example, the first synchronization metric can be the Maximum Time Interval Error (MTIE), and the second synchronization metric can be a predefined MTIE mask. Other synchronization metrics could also be utilized, as desired.

Figure 8:
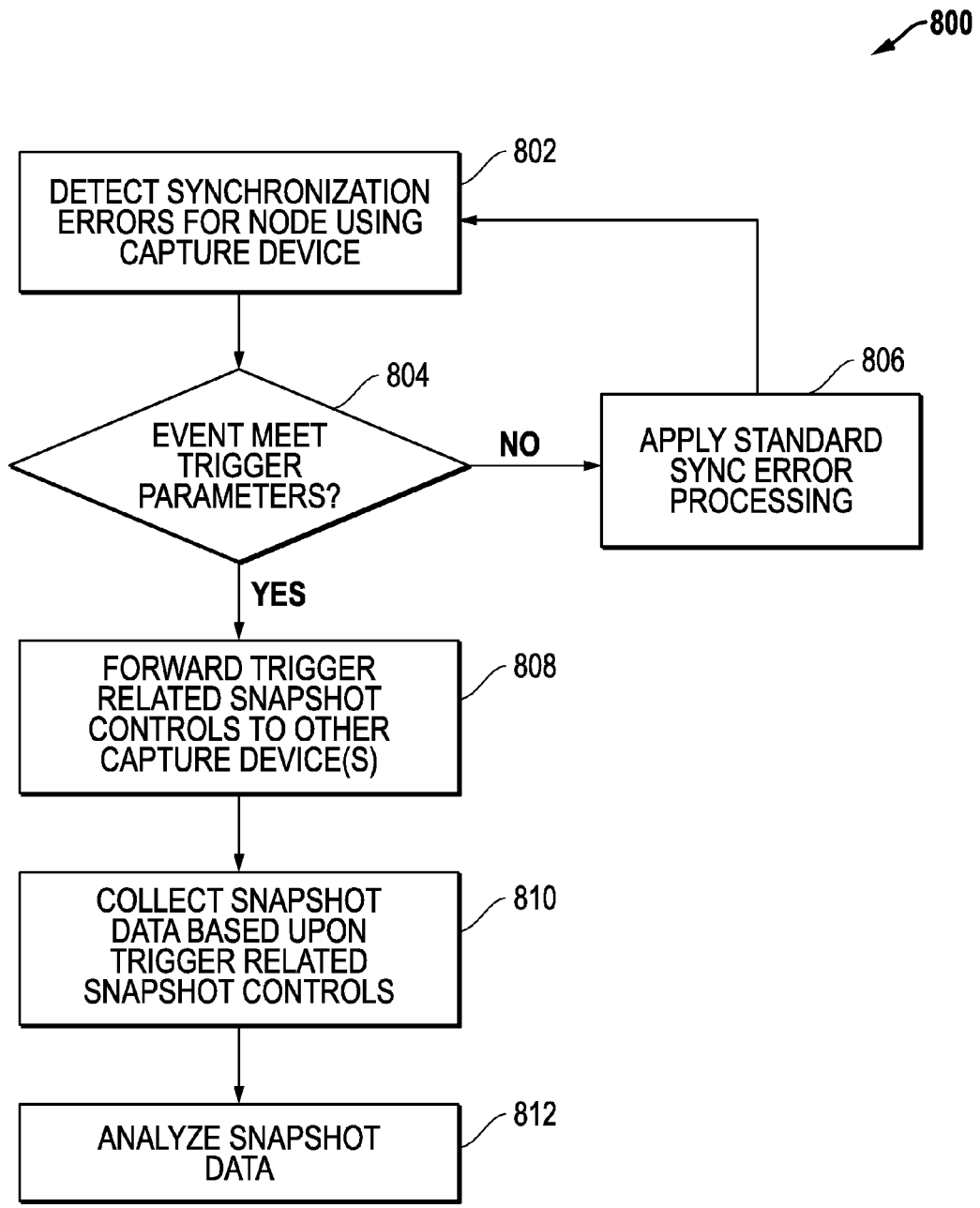
FIG. 8 is a process flow diagram of an embodiment for coordinating snapshots among multiple capture devices based upon detected trigger events.

FIG. 8 is a process flow diagram of an embodiment 800 for coordinating snapshots among multiple capture devices based upon detected trigger events. In block 802, synchronization errors are detected at a network node using a capture device. In block 804, a determination is made whether or not a synchronization error event meets trigger parameters. If "NO," then flow passes to block 806 where standard or non-trigger synchronization error processing is applied to the synchronization error event and related the snapshot data. If "YES," then flow passes to block 808 where trigger related snapshot controls are forwarded to one or more other capture devices. Next, in block 810, snapshot data is collected based upon the trigger related snapshot controls. In block 812, the trigger-related snapshot data is analyzed, as desired, to determine additional information concerning the trigger event.

With respect to the embodiments described herein, it is noted that the operational blocks described herein can be implemented using hardware, software, or a combination of hardware and software, as desired. In addition, integrated circuits, discrete circuits, or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired.

For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing system.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for monitoring network synchronization, comprising:

communicating control information from a central synchronization monitor to a plurality of capture devices;

capturing time information during a first time period with the plurality of capture devices based upon the control information, the plurality of capture devices being coupled to different monitoring points for a network being monitored;

comparing, with the plurality of capture devices, the time information captured during the first time period to time reference information to determine first synchronization metrics for the first time period;

transmitting time data associated with the first synchronization metrics from the plurality of capture devices to the central synchronization monitor;

analyzing, with the central synchronization monitor, the first synchronization metrics with respect to one or more second synchronization metrics to determine if a synchronization error is present with respect to the network being monitored;

if a synchronization error is determined to be present at one of the plurality of capture devices, communicating additional control information from the central synchronization monitor to one or more additional capture devices of the plurality of capture devices;

capturing additional time information during a second time period with the one or more additional capture devices of the plurality of capture devices based upon the additional control information; and determining, based on the additional time information, a first point in a timing chain within the network to be monitored where a signal is degraded.

2. The method of claim 1, wherein the capturing during the first time period comprises:
   capturing packets associated with a packet flow within the network being monitored;
   recording time stamps associated with arrival times for the captured packets, the time stamps providing the time reference information for the comparing; and
   analyzing the packets to identify timing information contained within the packets, the identified time information providing the time information captured during the first time period.

3. The method of claim 1, wherein the time information captured during the first time period and the additional time information captured during the second time period comprises time information generated by the plurality of capture devices.

4. The method of claim 1, wherein the time information captured during the first time period with the plurality of capture devices comprises time-of-day information generated by a network node within the network being monitored.

5. The method of claim 1, wherein the time information captured during the first time period with the plurality of capture devices comprises a clock signal generated by a network node within the network being monitored.

6. The method of claim 1, wherein the one or more second synchronization metrics are associated with time information captured from one or more previous time periods prior to the first time period.

7. The method of claim 1, wherein the one or more second synchronization metrics comprise one or more predefined threshold values.

8. The method of claim 7, wherein the one or more predefined threshold values comprises a threshold time error difference between the time information captured during the first time period and the time reference information.

9. The method of claim 1, wherein the time reference information is based upon time information from at least one of a satellite positioning system or a network-based timing protocol clock.

10. The method of claim 1, wherein the determined synchronization error comprises a trigger event associated with at least one of the plurality of capture devices.

11. The method of claim 1, further comprising applying one or more data reduction techniques to the time data from each of the plurality of capture devices prior to transmitting the time data from each of the plurality of capture devices.

12. The method of claim 11, wherein data reduction techniques comprise at least one of a data compression technique or a hash algorithm.

13. The method of claim 1, wherein the determined synchronization error comprises a synchronization impairment introduced by one or more network components associated with the monitoring points.

14. The method of claim 1, wherein the additional time information is captured by at least one capture device located within a first network domain and by at least one capture device located in a second network domain.

15. The method of claim 1, further comprising utilizing the additional time information captured during the second time period to determine where a time error was introduced within the network being monitored.

16. A system to monitor network synchronization, comprising:
   a central synchronization monitor; and
   a plurality of capture devices coupled to different monitoring points for a network being monitored, each of the plurality of capture devices comprising integrated circuits including one or more processors configured to execute instructions embodied in one or more non-transitory computer readable mediums to:
   receive control information from the central synchronization monitor;
   capture time information during a first time period based upon the control information;
   compare the time information captured during the first time period to time reference information to determine a first synchronization metric for the first time period; and
   transmit time data associated with the first synchronization metrics to the central synchronization monitor;
   wherein the central synchronization monitor comprises integrated circuits including one or more processors configured to execute instructions embodied in one or more non-transitory computer readable mediums to:
   analyze the first synchronization metric from each of the plurality of capture devices with respect to one or more second synchronization metrics to determine if a synchronization error is present with respect to the network being monitored;
   if a synchronization error is determined to be present at one of the plurality of capture devices, communicate additional control information to one or more additional capture devices of the plurality of capture devices;
   receive additional time information captured during a second time period with the one or more additional capture devices based upon the additional control information; and
   determine, based on the additional time information, a first point in a timing chain within the network to be monitored where a signal is degraded.

17. The system of claim 16, wherein each of the plurality of capture devices is further configured to capture packets associated with packet flows within the network being monitored and to generate time stamps associated with arrival times for the captured packets to provide the time reference information for the capture device.

18. The system of claim 17, wherein the time information captured by each of the plurality of capture devices during the first time period comprises timing information from captured packets.

19. The system of claim 16, wherein the time information captured by the plurality of capture devices during the first time period and the additional time information captured during the second time period comprises time information generated by the plurality of capture devices within the network being monitored.

20. The system of claim 16, wherein the time information captured by each of the plurality of capture devices comprises at least one of a clock signal or time-of-day information generated by a network node within the network being monitored.

21. The system of claim 16, wherein the one or more second synchronization metrics are associated with time information captured from one or more previous time periods prior to the first time period.

22. The system of claim 16, wherein the one or more second synchronization metrics comprise one or more predefined threshold values.

23. The system of claim 22, wherein the one or more predefined threshold values comprises a threshold time error difference between the time information captured by each of the plurality of capture devices during the first time period and the time reference information for each of the plurality of capture devices.

24. The system of claim 16, wherein the time reference information for each of the plurality of capture devices is based upon time information from at least one of a satellite positioning system or a network-based timing protocol clock.

25. The system of claim 16, wherein the determined synchronization error comprises a trigger event associated with at least one of the plurality of capture devices.

26. The system of claim 16, wherein each of the plurality of capture devices is further configured to apply one or more data reduction techniques to the time data prior to transmitting the time data.

27. The system of claim 16, wherein the determined synchronization error comprises a synchronization impairment introduced by one or more network components associated with the monitoring points.

28. The system of claim 16, wherein the additional time information is configured to be captured during the second time period by at least one capture device located within a first network domain and by at least one capture device located in a second network domain.

29. The system of claim 16, wherein the central snapshot synchronization monitor is further configured to receive the additional time information captured during the second time period and to use the additional time information to determine where a time error is introduced within the network being monitored.

\* \* \* \* \*